(12) United States Patent
Malmgren et al.

(10) Patent No.: US 6,778,501 B1
(45) Date of Patent: Aug. 17, 2004

(54) SELECTIVE REPEAT ARQ WITH EFFICIENT UTILIZATION OF BITMAPS

(75) Inventors: Göran Malmgren, Hägersten (SE); Gunnar Rydnell, Rävianda (SE); Jan Lindskog, Pixbo (SE); György Miklos, Budapest (HU); Hui Li, Nürnberg (DE); Fredrik Nilsson, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/543,156

(22) Filed: Apr. 4, 2000

Related U.S. Application Data (60) Provisional application No. 60/128,041, filed on Apr. 7, 1999.

(51) Int. Cl.[7] ............................................... H04L 12/56
(52) U.S. Cl. ....................................... 370/236; 370/394
(58) Field of Search ............................... 714/748, 749; 370/394, 242, 310, 473, 236

(56) References Cited

U.S. PATENT DOCUMENTS

| | | | |
|---|---|---|---|
| 5,440,545 A | * | 8/1995 | Buchholz et al. |
| 6,212,240 B1 | * | 4/2001 | Scheibel, Jr. et al. ....... 375/261 |
| 6,330,435 B1 | * | 12/2001 | Lazraq et al. ............... 455/412 |
| 6,367,045 B1 | * | 4/2002 | Khan et al. .................. 714/748 |
| 6,557,135 B1 | * | 4/2003 | Balachandran et al. ..... 714/748 |

FOREIGN PATENT DOCUMENTS

| | | |
|---|---|---|
| EP | 0 768 806 | 4/1997 |
| EP | 0 771 092 | 5/1997 |
| EP | 0 964 548 | 12/1999 |

* cited by examiner

Primary Examiner—Kenneth Vanderpuye (57) ABSTRACT

In a wireline or wireless telecommunications system or data network, which employs a Selective Repeat Automatic Repeat Request (ARQ) to convey data packet reception status for a sequence of data packets grouped together into a number of blocks of data packets, partial bit mapping is employed to improve efficiency, particularly with respect to bandwidth. This may be accomplished, more specifically, by including in the ARQ message that is sent from the receiver to the sender, a number of partial bitmaps, along with a corresponding number of bitmap block numbers, where a first bitmap block number identifies a particular one of the blocks of data packets and the corresponding bitmap defines the reception status of the data packets in that block. Each of the remaining bitmap block numbers identify an additional block of data packets relative to the first block of data packets. Accordingly, the remaining bitmap block numbers require fewer bits to identify their corresponding data packet blocks.

26 Claims, 5 Drawing Sheets

| SN(B) FIRST PDU IN BLOCK | | | | | | | | | | | SN(DEC) | BLOCK NO. |
|---|---|---|---|---|---|---|---|---|---|---|---|---|
| (7 MSB) | | | | | | | | (3 LSB) | | | | |
| 0 | 0 | 0 | 0 | 0 | 0 | 0 | ... | 0 | 0 | 0 | 0 | 1 |
| 0 | 0 | 0 | 0 | 0 | 0 | 0 | ... | 1 | 0 | 0 | 8 | 2 |
| 0 | 0 | 0 | 0 | 0 | 0 | 0 | ... | 1 | 0 | 0 | 16 | 3 |
| 0 | 0 | 0 | 0 | 0 | 0 | 0 | ... | 1 | 0 | 0 | 24 | 4 |
| 0 | 0 | 0 | 0 | 0 | 0 | 1 | ... | 1 | 0 | 0 | 32 | 5 |
| 0 | 0 | 0 | 0 | 0 | 0 | 1 | ... | 1 | 0 | 0 | 40 | 6 |
| 0 | 0 | 0 | 0 | 0 | 0 | 1 | ... | 1 | 0 | 0 | 48 | 7 |
| ... | ... | ... | ... | ... | ... | ... | ... | ... | ... | ... | ... | ... |
| 1 | 1 | 1 | 1 | 1 | 1 | 1 | ... | 1 | 0 | 0 | 1016 | 128 |

SELECTIVE REPEAT ARQ WITH EFFICIENT UTILIZATION OF BITMAPS

CROSS-REFERENCE TO RELATED APPLICATIONS

This application is related to, and claims priori from, U.S. Provisional Patent Application No. 60/128,041 filed Apr. 7, 1999, the contents of which are incorporated herein by reference.

FIELD OF INVENTION

The present invention involves the field of telecommunications. More particularly, the present invention involves the use of Automatic Repeat Request (ARQ) in wireline and wireless telecommunications systems and data networks.

BACKGROUND

Automatic Repeat Request (ARQ) is a commonly used technique in telecommunications systems and data networks. It is used to ensure the reliable delivery of data packets, herein referred to as protocol data units (PDUs), from a sending entity (herein referred to as a sender) to a receiving entity (herein referred to as a receiver). In general, ARQ employs an error detection code during data transmission. The error detection code allows the receiver to determine whether a PDU was correctly received. ARQ also employs a feedback mechanism, which the receiver uses to notify the sender that a PDU was or was not correctly received. The sender may then retransmit the PDU based on the feedback provided by the receiver.

There are three main ARQ types: Stop-and-Wait, Go-Back-N, and Selective Repeat. In accordance with the Stop-and-Wait ARQ technique, a sender does not send a new PDU to the receiver until the sender receives positive acknowledgment (i.e., an ACK signal) from the receiver that the previous PDU has been successfully received. In accordance with the Go-Back-N ARQ technique, the sender may transmit one or more PDUs before it receives an ACK signal from the receiver regarding previous PDUs. If, however, the sender receives a negative acknowledgement (i.e., a NACK signal) from the receiver indicating that a previous PDU was not successfully received, the sender retransmits the missing or incorrectly received PDU, as well as all subsequent PDUs, whether or not any of the subsequent PDUs were received correctly. In accordance with the Selective Repeat ARQ technique, the receiver provides a combination of ACK and NACK signals. The sender then retransmits those PDUs which were not successfully received. The sender does not retransmit, as in the Go-Back-N ARQ technique, all subsequent PDUs. Of course, there are variations associated with each of the three main ARQ types. The present invention, however, deals with the Selective Repeat ARQ technique.

Typically, the Selective Repeat ARQ messages that convey PDU reception status, are transported from the receiver to the sender in a special PDU called a control PDU (C-PDU). The PDU reception status information being conveyed to the sender in a C-PDU should, of course, be formatted in an efficient manner, particularly with respect to bandwidth. Failure to efficiently utilize bandwidth can lead to unnecessary PDU transmission delays, which in turn, can be extremely detrimental when dealing with applications such as real-time voice and/or video, which are particularly sensitive to such delays. Accordingly, a C-PDU format that is specifically designed to convey PDU reception status information (e.g., ACK and NACK information) in a more bandwidth efficient manner is highly desirable.

SUMMARY OF THE INVENTION

The present invention deals with a bandwidth efficient C-PDU format for conveying Selective Repeat ARQ messages, particularly PDU reception status information (e.g., ACK and NACK signals), from a receiver to a sender in a wireline or wireless telecommunications system or data network. The sender can, based on the PDU status information, determine whether certain PDUs in its buffer should be released, to make room for new PDUs, or retransmitted in the event they were not successfully received. The bandwidth efficient C-PDU format of the present invention employs a number of "partial bitmaps" wherein each partial bitmap defines the PDU reception status for the PDUs associated with a corresponding block of PDUs, which are currently eligible for transmission from the sender to the receiver. Moreover, each of the corresponding blocks of PDUs, for which the partial bitmaps contain PDU reception status information, are defined relative to each other. As such, fewer bits are needed to define the corresponding blocks of PDUs. In addition, the C-PDU format includes an ARQ bandwidth increase request (ABIR) bit, which is employed by the receiver to request an increase in the ARQ signaling bandwidth.

Accordingly, it is an objective of the present invention to convey ARQ messages, particular PDU reception status information, from a receiver to a sender in a wireline or wireless telecommunications system or network.

It is another objective of the present invention to convey PDU reception status information using a control PDU (i.e., a C-PDU).

It is still another objective of the present invention to provide a bandwidth efficient C-PDU format for conveying PDU reception status information.

It is yet another objective of the present invention to enhance the reliability of PDU delivery and minimize the risk of PDU transmission delays.

In a first aspect of the present invention, the above-identified and other objectives are achieved with a method for acknowledging data packet reception status, in accordance with a Selective Repeat ARQ scheme, for a sequence of data packets being transmitted from a sending node to a receiving node in a telecommunications network, wherein each data packet is assigned a sequence number indicating an order of transmission, and wherein the sequence of data packets are grouped into fixed blocks of data packets. The method involves generating a first bitmap number which identifies a first block of data packets, and generating a first bitmap which defines the reception status for the data packets associated with the first block of data packets. The method also involves generating a second bitmap number which identifies a second block of data packets relative to the first block of data packets, and generating a second bitmap which defines the reception status for the data packets associated with the second block of data packets. The first bitmap number, the first bitmap, the second bitmap number and the second bitmap are then transmitted from the receiver to the sender.

In a second aspect of the present invention, the above-identified and other objectives are achieved with a method for acknowledging protocol data unit (PDU) reception status, in accordance with a Selective Repeat ARQ scheme, wherein the PDUs are grouped into a first number of blocks of PDUs, and each PDU is assigned a sequence number indicating an order of transmission, and wherein the Selective Repeat ARQ scheme employs a transmission window that defines an interval of PDUs that are eligible for transmission from a sender to a receiver. This method involves generating a first bitmap block number, which identifies a first block of PDUs, and generating a first bitmap, which defines the reception status for the PDUs in the first block of PDUs. The method also involves generating a second bitmap block number, which identifies a second block of PDUs relative to the first block of PDUs, and generating a second bitmap, which defines the reception status for the PDUs in the second block of PDUs. Then, a control PDU is transmitted from the receiver to the sender, where the control PDU contains the first bitmap block number, the first bitmap, the second bitmap block number and the second bitmap.

In a third aspect of the present invention, the above-identified and other objectives are achieved with a method for determining reception status, in accordance with a Selective Repeat ARQ scheme, for a number of protocol data units (PDUs) that have been transmitted from a sender to a receiver, the PDUs being grouped into a first number of fixed blocks of PDUs, wherein each of the PDUs are identified by a corresponding sequence number, and wherein the Selective Repeat ARQ scheme employs a transmission window that defines an interval of PDUs that are currently eligible for transmission, the interval of PDUs being grouped into a second number of fixed blocks of PDUs, which is a subset of the first number of fixed blocks of PDUs. This method involves receiving, at the sender, a control PDU transmitted by the receiver, where the control PDU contains a first bitmap block number, a second bitmap block number, a first bitmap, and a second bitmap. A first block of PDUs is then identified from amongst the second number of fixed blocks of PDUs that are associated with the transmission window, based on the value of the first bitmap block number. Next, the reception status for the PDUs associated with the first block of PDUs is determined as a function of the first bitmap. The method then involves identifying a second block of PDUs, from amongst the second number of fixed blocks of PDUs that are associated with the transmission window, based on the value of the second bitmap block number and the value of the first bitmap block number, where the second bitmap block number identifies the second block of PDUs relative to the first block of PDUs. Finally, the reception status for the PDUs associated with the second block of PDUs is determined, as a function of the second bitmap.

In a fourth aspect of the present invention, the above-identified and other objectives are achieved with a data packet protocol that conveys reception status, in accordance with a Selective Repeat ARQ scheme, for a number of protocol data units (PDUs) that have been transmitted from a sender to a receiver, the PDUs being grouped into a first number of fixed blocks. The protocol includes a first bitmap block number, where the first bitmap block number identifies a first block of PDUs, and a first bitmap, where the first bitmap conveys the reception status for a number of PDUs in the first block of PDUs. The protocol also includes a second bitmap block number, where the second bitmap block number identifies a second block of PDUs relative to the first block of PDUs, and a second bitmap, where the second bitmap conveys the reception status for a number of PDUs in with the second block of PDUs.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Figure 1:
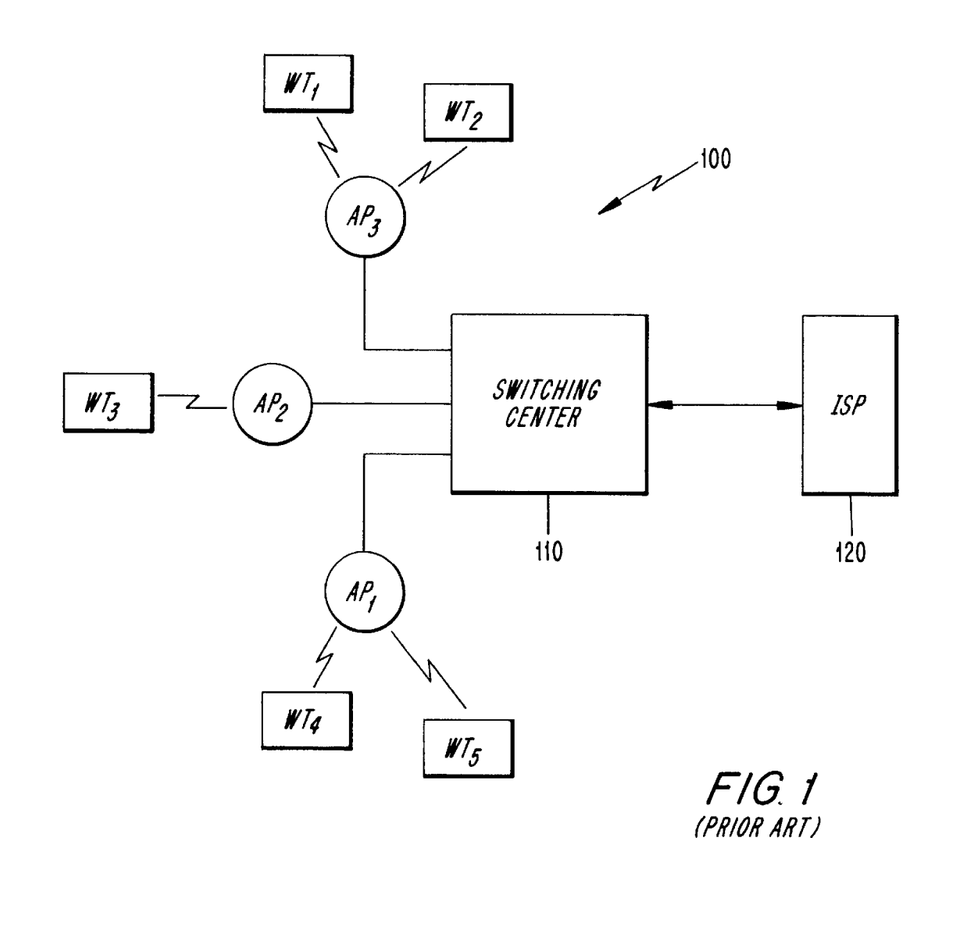
FIG. 1 illustrates a typical wireless local area network (WLAN)

The present invention involves telecommunications networks, particularly, though not necessarily limited to, wireless local area networks (WLAN) such as the High Performance Local Area Network Type Two (i.e., HIPERLAN/2). FIG. 1 shows an exemplary WLAN 100, or a portion thereof. WLAN 100 includes, for example, a switching center 110, several access points (APs) 110, and a number of wireless terminals (WTs), wherein each WT is associated with one of the APs, depending on the location of the WT, as one skilled in the art will readily appreciate. In addition, the switching center 110 may be connected to the Internet through an Internet Service Provider 120.

When data and/or control information is sent from one network node to another, for example, from an AP to one or more associated WTs, the data and/or control information is transmitted in a sequence of protocol data units (i.e., PDUs). At some point prior to transmission from the sender to the receiver, each PDU is assigned a sequence number, in order to identify and distinguish one PDU from another, as well as the data and/or control information contained therein. In addition to distinguishing one PDU from other PDUs, the sequence numbers also define the order in which the PDUs were transmitted from the sender to the receiver. In general, the sequence numbers will range from 0 through $2^k-1$, in a binary format, where k is the number of bits comprising each sequence number. In order to simplify the following description, k is assumed to be 10 bits, though one skilled in the art will understand that the value of k can be less than or greater than 10 bits.

Given the assumption that each sequence number is defined by a 10 bit value, 1024 sequence numbers can be assigned to PDUs before the sequence numbers begin to repeat. However, only a smaller group of these PDUs are, at any given time, eligible for transmission (or retransmission), wherein the group of PDUs that are currently eligible for transmission are said to be within a "transmission window." In order to avoid ambiguities relating to PDU identification, which might arise if two PDUs having the same sequence number are within the transmission window simultaneously, the size of the transmission window, i.e., the maximum number of PDUs eligible for transmission at any given time, is limited to $2^{k-1}$ PDUs, where k, once again, is the number of bits which comprise each sequence number. If it is assumed that k equals 10, the maximum size of the transmission window is 512 PDUs.

Figure 2:
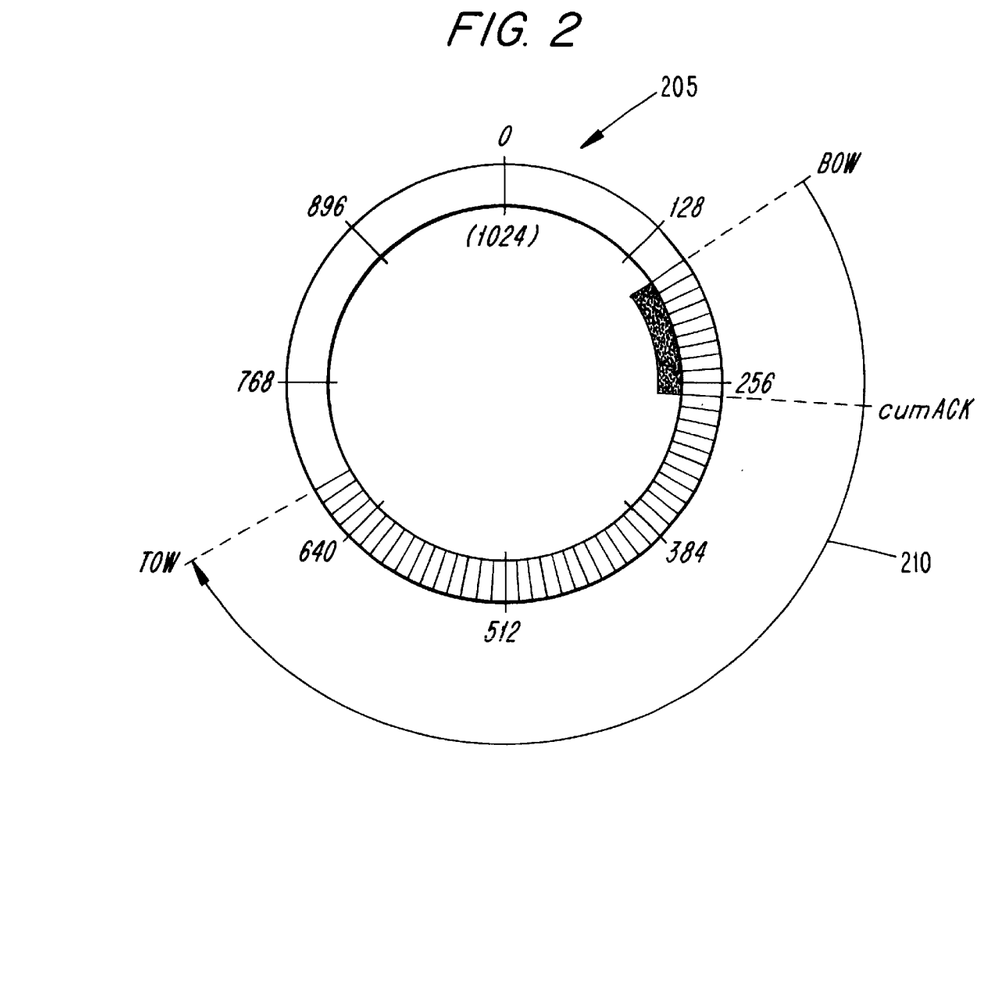
FIG. 2 illustrates the concept of a PDU transmission window.

FIG. 2 illustrates in more detail the concept of the transmission window. As shown, the circular object 205 represents the range of sequence numbers that can be assigned to PDUs. Assuming a 10-bit sequence number, the circumference of the circular object 205 is numbered from 0 to 1023 (i.e., 0 to $2^{k-1}$, where k represents the number of bits). In contrast, the semi-circular arrow 210 represents the transmission window comprising a maximum of 512 PDUs ranging from N to N+511. These 512 PDUs are eligible for transmission as they fall within the transmission window. The "bottom" of the transmission window (BOW) identifies the PDU in the transmission window that has the earliest not yet acknowledged sequence number. The "top" of the transmission window (TOW) identifies the PDU in the transmission window that has a more recently issued sequence number than the PDU that corresponds with the BOW, and is separated from the PDU that corresponds with the BOW by a number of PDUs equivalent to the size of the transmission window. The cumACK represents the PDU having the earliest issued sequence number which has not yet been received. The cumACK causes the BOW and, for that mater, the entire transmission window 210, to shift. In FIG. 2, this shift is illustrated by the semi-circular arrow 210 pointing in the clockwise direction around circular object 205, which, as stated above, represents the range of sequence numbers that can be assigned to PDUs. As the transmission window shifts, as illustrated in FIG. 2, additional PDUs become eligible for transmission.

The transmission environment is, of course, rarely ideal. Consequently, a PDU, and more particularly, the data and/or control information contained therein, may be corrupted or lost during transmission. In the event a PDU is not successfully received, for example, because it was corrupted or lost during transmission, techniques such as ARQ are employed to provide PDU reception status information, so that the sender can, if necessary, retransmit a missing or corrupted PDU.

As previously mentioned, there are different ARQ techniques. The present invention, however, is primarily involved with the Selective Repeat ARQ technique, wherein a combination of ACK, NACK and cumACK signals are, in general, transmitted from a receiver to a sender so that the sender can determine the reception status of one or more PDUs that are currently within the transmission window. Based on the PDU reception status information, the sender can, if necessary, retransmit PDUs that have not been successfully received, as well as release PDUs that have been successfully received, so that the transmission window can advance and new PDUs can become eligible for transmission. It will be noted that the ARQ PDU reception status information is conveyed from the receiver to the sender in a special PDU, known as a control PDU (i.e., C-PDU).

Figure 3:
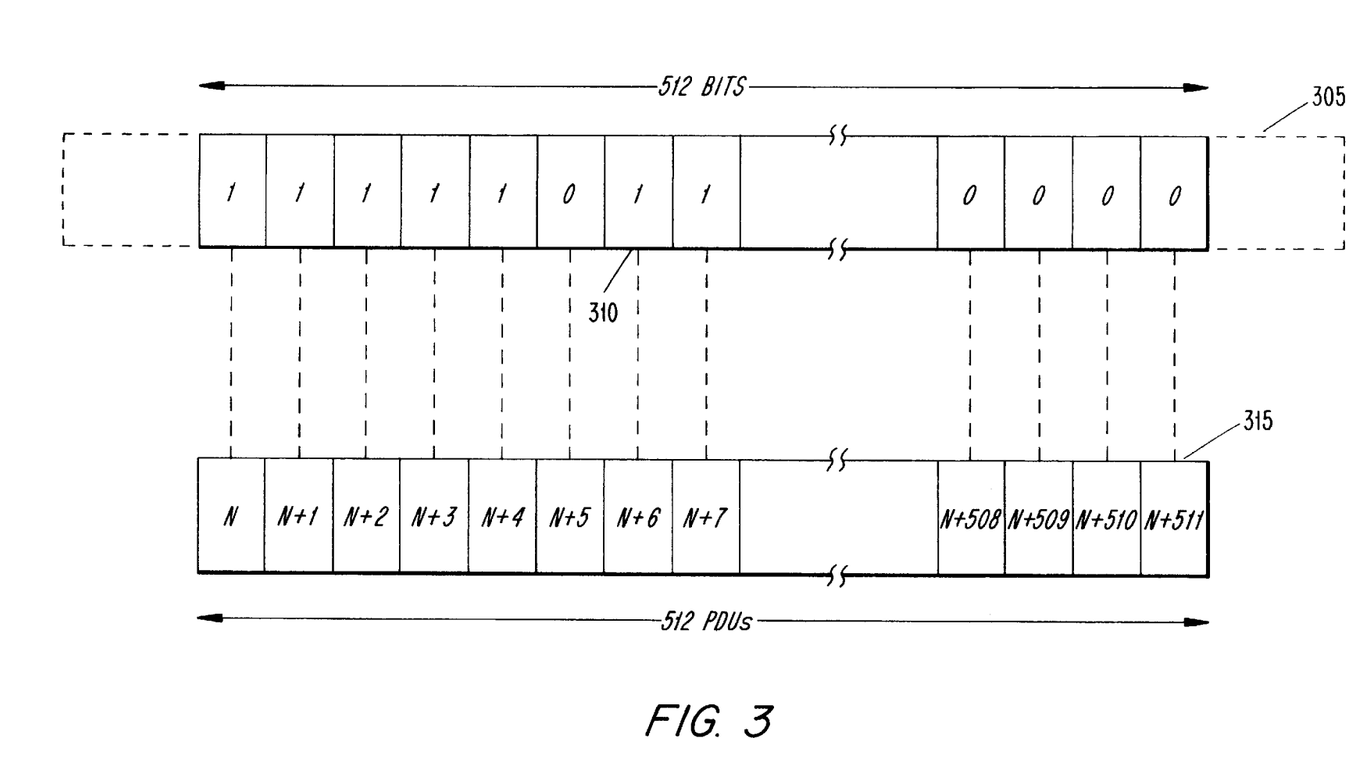
FIG. 3 depicts an exemplary control PDU, which conveys PDU reception status information by employing a "whole" bitmap approach.

One method for conveying ARQ PDU reception status information from a receiver to a sender in a C-PDU involves the use of bitmaps. FIG. 3 illustrates an exemplary C-PDU 305 that contains, among other information, a bitmap 310 for conveying PDU reception status information to the sender. The particular method illustrated in FIG. 3 for conveying ARQ PDU reception status information follows a somewhat conventional approach, wherein the bitmap 310 contains a separate bit for each of the PDUs N through N+511 in the transmission window 315. Consequently, the length of the bitmap in C-PDU 301 must be 512 bits long.

C-PDUs, such as C-PDU 305, are transmitted to the sender. The sender, upon receiving the C-PDU, decodes the bitmap 310. If, for example, the sender, in decoding the bitmap, determines that the value of a particular bit is "1", that might indicate the corresponding PDU in the transmission window has been successfully received. Therefore, a bit in the bitmap 310 having a value of "1" equates to an ACK signal. Conversely, a bit in the bitmap 310 having a value of "0" might indicate that the corresponding PDU in the transmission window has not yet been successfully received, thereby equating to a NACK signal. An uninterrupted string of bits, beginning with the first bit in the bitmap 310, having a value of "1" could serve, as one skilled in the art will appreciate, as a cumACK signal, as illustrated by the first five (5) bits in bitmap 310.

The bitmap 310, illustrated in FIG. 3, might be described as being a "whole" bitmap, because the bitmap 310 contains a bit for each PDU in the transmission window. Thus, the bitmap 310 covers the whole (i.e., entire) transmission window. However, this whole bitmap approach is not overly efficient, particularly in terms of bandwidth. As shown, the bitmap field alone requires 512 bits.

Figure 4:
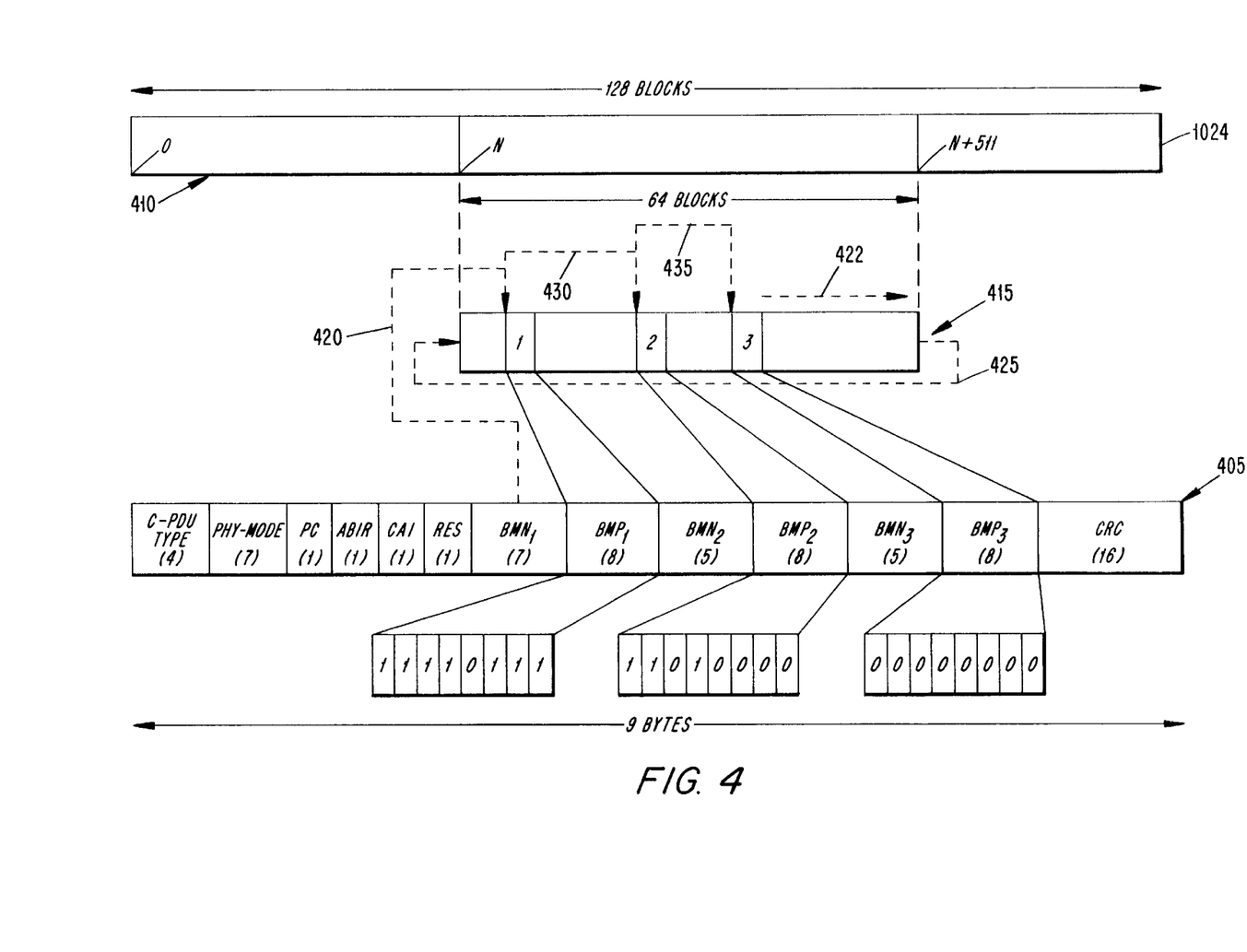
FIG. 4 illustrates an exemplary control PDU, which conveys PDU reception status information by employing a "partial" bitmap approach, in accordance with exemplary embodiments of the present invention.

FIG. 4 illustrates, among other things, a C-PDU 405 that conveys, in a more efficient manner, ARQ PDU reception status information, in accordance with an exemplary embodiment of the present invention. More specifically, FIG. 4 illustrates a sequence of 1024 PDUs 410, a transmission window 415 and the relationship between the sequence of PDUs 410, the transmission window 415 and the aforementioned C-PDU 405. As shown, the sequence of PDUs 410 range in sequence number from 0 to 1023, and comprises 128 blocks of PDUs, where each block contains 8 PDUs. The transmission window 415, as shown, spans 512 of the 1024 PDUs, or 64 blocks of PDUs, wherein the BOW corresponds with the PDU that was assigned the sequence number N, while the TOW corresponds with the PDU that was assigned the sequence number N+511. Thus, PDUs N through N+511 are currently eligible for transmission, as previously explained.

In contrast with C-PDU 305, which contains a "whole" bitmap comprising 512 bits, C-PDU 405 contains a number of "partial" bitmaps to convey ARQ PDU reception status information. A 9-byte C-PDU, such as C-PDU 405, may reasonably contain up to three (3), 8-bit partial bitmaps, $BMP_1$, $BMP_2$ and $BMP_3$, where the number of bits associated with each partial bitmap (e.g., 8 bits) corresponds to the number of PDUs in a block of PDUs (e.g., 8 PDUs). As will be explained in greater detail below, each of the bitmaps $BMP_1$, $BMP_2$ and $BMP_3$ contain PDU reception status information for a corresponding block of PDUs, herein referred to as $BLOCK_1$, $BLOCK_2$ AND $BLOCK_3$ respectively, in the transmission window 415 as shown. Of course, it will be understood that less than three unique bitmaps might be used, thereby permitting at least one bitmap to be repeated, which offers additional robustness.

In addition to the partial bitmaps $BMP_1$, $BMP_2$ and $BMP_3$, C-PDU 405 contains a corresponding bitmap block number $BMN_1$, $BMN_2$ and $BMN_3$ for each of the partial bitmaps $BMP_1$, $BMP_2$ and $BMP_3$, respectively. In accordance with a preferred embodiment of the present invention, each bitmap block number defines the particular block of PDUs for which the corresponding partial bitmap contains PDU reception status information. Accordingly, bitmap block number BMP, defines the location of $BLOCK_1$, wherein $BMP_1$ contains the PDU reception status information for the 8 PDUs in $BLOCK_1$. Similarly, bitmap block number $BMP_2$ defines the location of $BLOCK_2$, wherein $BMP_2$ contains the PDU reception status information for the 8 PDUs in $BLOCK_2$. Finally, bitmap block number BMP3 defines the location of $BLOCK_3$, wherein BMP3 contains the PDU reception status information for the 8 PDUs in $BLOCK_3$.

Figure 5:
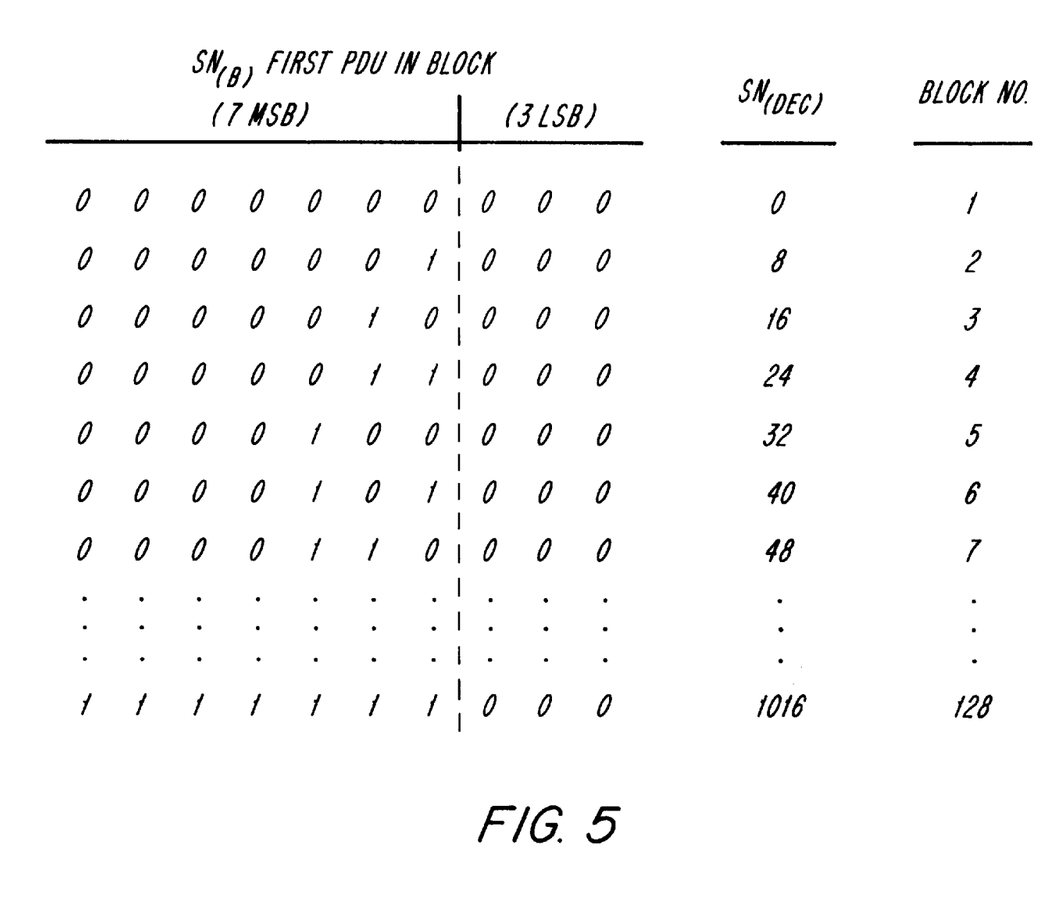
FIG. 5 illustrates the reason why only the seven (7) most significant bits of the sequence number associated with the first PDU in each block of PDUs is needed to distinguish any one block of PDUs from the others, assuming there are eight (8) PDUs per block.

Further in accordance with a preferred embodiment of the present invention, the first bitmap block number $BMN_1$, defines the location of BLOCK$_1$ in absolute terms. The term "absolute", as used herein, means that the value of BMN$_1$, by itself, can define BLOCK$_1$ as being any one of the 128 blocks of PDUs that make up the sequence of PDUs 410. More specifically, BMN$_1$ defines this first BLOCK$_1$ by defining the sequence number of the first PDU in BLOCK$_1$, as indicated by the "dashed" line 420 in FIG. 4. It should be noted that because each of the 128 blocks contains 8 PDUs, and because the first PDU in the first of the 128 blocks has a sequence number of 0000000000$_{(BINARY)}$, the first PDU in each of the 128 blocks of PDUs can be distinguished from one another by the 7 most significant bits of their respective sequence numbers, as illustrated in FIG. 5. In other words, the 3 least significant bits associated with the sequence number of the first PDU in each of the 128 blocks of PDUs can be ignored for the purpose of defining the corresponding block. Accordingly, bitmap block number BMN$_1$ can "absolutely" define any one of the 128 blocks of PDUs as a function of the 7 most significant bits in the sequence number of the first PDU in BLOCK$_1$. For this reason, BMN$_1$, in C-PDU 405, is shown as having a length of 7 bits.

Further in accordance with a preferred embodiment of the present invention, the second bitmap block number BMN$_2$ defines the sequence number of the first PDU in BLOCK$_2$. However, for the purpose of conserving bandwidth, BMN$_2$ defines the sequence number of the first PDU in BLOCK$_2$ relative to the sequence number associated with the first PDU in BLOCK$_1$, as illustrated by "dashed" line 430. Since there are but 64 consecutive blocks of PDUs that make up the transmission window 415, the maximum number of blocks separating BLOCK$_1$ and BLOCK$_2$ in the transmission window is 32 blocks, as indicated by arrows 422 and 425. Therefore, BMN$_2$ need only take on any one of 32 different values. Thus, BMN$_2$ is 5 bits in length.

The third bitmap block number BMN$_3$, of course, defines the sequence number of the first PDU in BLOCK$_3$. BMN$_2$ defines the sequence number of the first PDU in BLOCK$_3$ relative to the sequence number associated with the first PDU in BLOCK$_1$, as defined by BMN$_1$. Alternatively, BMN$_2$ may define the sequence number of the first PDU in BLOCK$_3$ relative to the sequence number associated with the first PDU in BLOCK$_2$, as illustrated by "dashed" line 435. In either case, the length of BMN$_3$ need not exceed 5 bits, so that BMN$_3$ can take on any one of 32 different values, corresponding to the 32 blocks of PDUs located in the transmission window 410 in a forward or reverse direction relative to either BLOCK$_1$ or BLOCK$_2$.

The partial bitmaps contained in the C-PDU 405 may be fixed or floating bitmaps. Fixed bitmaps are constructed by dividing all of the sequence numbers, for example, all of the sequence numbers associated with the sequence of PDUs 410, into a number of fixed blocks. For instance, a first bitmap might correspond to sequence numbers 0 through 7, a second bitmap to sequence numbers 8 through 15, and so on. This scheme results in 128 possible bitmaps given the 1024 sequence numbers. The method of floating bitmaps involves allowing a bitmap to represent 8 contiguous sequence numbers starting anywhere, e.g., at a cumACK point. In order to facilitate memory handling, fixed bitmaps are preferable.

The C-PDU 405 also contains a cumulative ACK (cumACK) indicator bit (CAI). The CAI bit, if set to the value of "1", indicates that the first bitmap BMP$_1$ reflects a cumACK signal. More specifically, if the CAI bit is set to the value of "1", BLOCK$_1$ contains the PDU having the earliest assigned sequence number of any PDUs that have not been acknowledged as being successfully received. Although it is unnecessary for all C-PDUs to contain a cumACK bit, it will be understood that a cumACK bit must at least appear on a regular basis so that the sender can release acknowledged PDUs from its buffer, thereby making room for new PDUs and allowing for the transmission window to advance.

The ARQ C-PDU 405 also contains an ARQ bandwidth increase request (ABIR) bit, which is used by the receiver to request an increase in the ARQ signaling bandwidth. The default value for the ABIR bit would be zero, indicating that the ARQ feedback signaling bandwidth is sufficient. The actual amount of additional bandwidth may be determined by the scheduler.

The C-PDU 405 also includes a flow control (FC) bit. The FC bit, when set, indicates a flow control STOP condition. The receiver may set the FC bit when some trigger event occurs, e.g. the RECEIVER runs out of receive buffer space. In order to prevent the network from locking-up, the receiver may discard any new PDUs when the FC bit is set to the value of "1". The receiver may, however, continue to send C-PDUs containing ARQ messages covering blocks of PDUs which it can accept. When the FC bit is set to "0", it indicates normal receiver operations. The FC bit may be set in every C-PDU as long as the receiver is experiencing a STOP condition.

Other control fields in the C-PDU 405 include a C-Type field. The C-Type field may be 4 bits in length so that it can identify one of 16 different control type messages, such as, ARQ messages, capacity request messages, or antenna control messages. The C-PDU 405 may also include a PHY-Mode field. The PHY-Mode field may be 7 bits in length, and it would be used in controlling operations at the physical layer. For example, the PHY-Mode field may be used to alter the modulation scheme.

The present invention has been described with reference to a number aspects and various exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. A method for acknowledging data packet reception status, in accordance with a Selective Repeat ARQ scheme, for a sequence of data packets being transmitted from a sending node to a receiving node in a telecommunications network, wherein each data packet is assigned a sequence number indicating an order of transmission, and wherein the sequence of data packets are grouped into blocks of data packets, said method comprising the steps of:

generating a first bitmap number which identifies a first block of data packets by defining the sequence number of the first data packet in the first block of data packets;

generating a first bitmap which defines the reception status for the data packets associated with the first block of data packets;

generating a second bitmap number which identifies a second block of data packets relative to the first block of data packets;

generating a second bitmap which defines the reception status for the data packets associated with the second block of data packets; and transmitting the first bitmap number, the first bitmap, the second bitmap number and the second bitmap from the receiver to the sender.

2. The method of claim 1, wherein the first bitmap number comprises a first number of bits required to distinguish the sequence number associated with the first data packet in the first block of data packets from the sequence number associated with the first data packet in all remaining blocks of data packets.

3. The method of claim 2, wherein the second bitmap number identifies the second block of data packets by defining the sequence number of the first data packet in the second block of data packets, as a function of the sequence number associated with the first data packet in the first block of data packets.

4. The method of claim 3, wherein the second bitmap number comprises a second number of bits required to identify the sequence number associated with the first data packet in the second block of data packets as a function of the sequence number of the first data packet in the first block of data packets.

5. The method of claim 4, wherein the second number of bits associated with the second bitmap number is less than the first number of bits associated with the first bitmap number.

6. A method for acknowledging protocol data unit (PDU) reception status in accordance with a Selective Repeat ARQ scheme, wherein the PDUs are grouped into a first number of blocks of PDUs, and each PDU is assigned a sequence number indicating an order of transmission, and wherein the Selective Repeat ARQ scheme employs a transmission window that defines an interval of PDUs that are eligible for transmission from a sender to a receiver, said method comprising the steps of:

generating a first bitmap block number, said first bitmap block number identifying a first block of PDUs wherein said first block of PDUs, defined by said first bitmap block number, is any one of the second number of blocks of PDUs;

generating a first bitmap, wherein said first bitmap defines the reception status for the PDUs in the first block of PDUs;

generating a second bitmap block number, said second bitmap block number identifying a second block of PDUs relative to said first block of PDUs;

generating a second bitmap, wherein said second bitmap defines the reception status for the PDUs in the second block of PDUs; and transmitting a control PDU from the receiver to the sender, wherein the control PDU contains the first bitmap block number, the first bitmap, the second bitmap block number and the second bitmap.

7. The method of claim 6, wherein the transmission window comprises a second number of blocks of PDUs, said second number of blocks of PDUs being no greater than one-half of said first number of blocks of PDUs.

8. The method of claim 7, wherein said first bitmap block number comprises a first number of bits required to distinguish the sequence number associated with the first PDU in the first block of PDUs from the sequence number associated with the first PDU in all remaining blocks of PDUs; and wherein said second bitmap block number comprises a second number of bits required to identify the sequence number associated with the first PDU in the second block of PDUs as a function of the sequence number of the first PDU in the first block of PDUs; and wherein said first number of bits associated with said first bitmap block number is greater than said second number of bits associated with said second bitmap block number.

9. The method of claim 6 further comprising the step of:
setting a control bit in the control PDU, wherein the control bit, when set, indicates that said first bitmap identifies a PDU in the first block of PDUs as not being successfully received, wherein the PDU was transmitted from the sender to the receiver before any other PDUs currently in the transmission window that have not been successfully received.

10. The method of claim 6 further comprising the step of:
setting a control bit in the control PDU, wherein the control bit, when set, indicates a STOP condition, and wherein the receiver, while the control bit is set, cannot accept PDUs that have not been transmitted previously.

11. A method for determining reception status, in accordance with a Selective Repeat ARQ scheme, for a number of protocol data units (PDUs) that have been transmitted from a sender to a receiver, said PDUs being grouped into a first number of blocks of PDUs, wherein each of the PDUs are identified by a corresponding sequence number, and wherein the Selective Repeat ARQ scheme employs a transmission window that defines an interval of PDUs that are currently eligible for transmission, said interval of PDUs being grouped into a second number of blocks of PDUs, which is a subset of said first number of blocks of PDUs, said method comprising the steps of:

receiving, at the sender, a control PDU transmitted by the receiver, wherein the control PDU contains a first bitmap block number, a second bitmap block number, a first bitmap, and a second bitmap;

identifying a first block of PDUs, from amongst the second number of blocks of PDUs that are associated with the transmission window, based on the value of the first bitmap block number;

determining the reception status for the PDUs associated with the first block of PDUs, as a function of the first bitmap;

identifying a second block of PDUs, from amongst the second number of blocks of PDUs that are associated with the transmission window, based on the value of the second bitmap block number and the value of the first bitmap block number, wherein the second bitmap block number identifies the second block of PDUs relative to the first block of PDUs; and determining the reception status for the PDUs associated with the second block of PDUs, as a function of the second bitmap.

12. The method of claim 11, wherein the first bitmap block number defines the sequence number of the first PDU in the first block of PDUs; and wherein the second bitmap block number defines the sequence number of the first PDU in the second block of PDUs.

13. The method of claim 12, wherein the first bitmap block number comprises a first number of bits required to distinguish the sequence number of the first PDU in the first block of PDUs from the sequence number of the first PDU in any of the remaining first number of blocks of PDUs; and wherein the second bitmap block number comprises a second number of bits required to identify the sequence number of the first PDU in the second block of PDUs as a function of the sequence number of the first PDU in the first block of PDUs; and wherein the first number of bits associated with the first bitmap block number is greater than the second number of bits associated with the second bitmap block number.

14. The method of claim 11 further comprising the step of:
  determining whether a control bit in the control PDU is set; and
  if the control bit is set, identifying the first block of PDUs as containing a PDU that has not been successfully received, which also has a sequence number indicating the PDU was transmitted before any other PDUs in the transmission window that have not yet been successfully received.

15. The method of claim 11 further comprising the step of:
  determining whether a control bit in the control PDU is set, wherein the control bit, when set, indicates a STOP condition, during which, the receiver cannot accept any PDU that has not been previously transmitted.

16. The method of claim 15 further comprising the steps of:
  prohibiting the transmission of PDUs to the receiver that have not been previously transmitted, if it is determined that the control bit is set.

17. In a telecommunication system a control protocol data unit sent by a receiver to a sender in said telecommunication system for conveying reception status in accordance with a Selective Repeat ARQ scheme, for a number of protocol data units (PDUs) that have been transmitted from the sender to the receiver, the PDUs being grouped into a first number of blocks, said control protocol data unit comprising:
  a transmission window for defining an interval of PDUs eligible for transmission;
  a first bitmap block number, for identifying a first block of PDUs;
  a first bitmap, for conveying the reception status for a number of PDUs in the first block of PDUs;
  a second bitmap block number, for identifying a second block of PDUs relative to said first block of PDUs; and
  a second bitmap, for conveying the reception status for a number of PDUs in with the second block of PDUs.

18. The control protocol data unit of claim 17, wherein the PDUs eligible for transmission are grouped into a second number of blocks, said second number of blocks being a subset of said first number of blocks.

19. The control protocol data unit of claim 18, wherein said first bitmap block number comprises a first number of bits required to uniquely identify the first block of PDUs; and wherein said second bitmap block number comprises a second number of bits required to uniquely identify the second block of PDUs, relative to the identity of the first block of PDUs, and wherein the first block of PDUs and the second block of PDUs are part of the second number of blocks that make up the transmission window.

20. The control protocol data unit of claim 19, wherein the first number of bits associated with said first bitmap block number is greater than the second number of bits associated with said second bitmap block number.

21. The control protocol data unit of claim 17 further comprising:
  a CumAck bit, for notifying the sender that said first block of PDUs contains a PDU that was not successfully received, which also has a sequence number indicating that the PDU was transmitted before any other PDUs associated with the transmission window that have not been successfully received.

22. The control protocol data unit of claim 17 further comprising:
  a flow control bit, for notifying the sender of a STOP condition, during which the receiver cannot accept PDUs that have not previously been transmitted.

23. The control protocol data unit of claim 22, wherein the sender, upon receiving the notification that a STOP condition exists, suspends the transmission of any PDU that has not been previously transmitted.

24. The control protocol data unit of claim 17 further comprising:
  a resource request bit, for notifying the sender that additional bandwidth is required by the receiver to provide sufficient reception status feedback for the sender.

25. The control protocol data unit of claim 17 further comprising:
  a third bitmap block number, for identifying a third block of PDUs relative to said second block of PDUs; and
  a third bitmap, for conveying the reception status for a number of PDUs in the third block of PDUs.

26. The control protocol data unit of claim 17 further comprising:
  a third bitmap block number, for identifying a third block of PDUs relative to said first block of PDUs; and
  a third bitmap, for conveying the reception status for a number of PDUs in the third block of PDUs.

* * * * *

UNITED STATES PATENT AND TRADEMARK OFFICE
CERTIFICATE OF CORRECTION

| | |
|---|---|
| PATENT NO. | : 6,778,501 B1 |
| APPLICATION NO. | : 09/543156 |
| DATED | : August 17, 2004 |
| INVENTOR(S) | : Malmgren et al. |

It is certified that error appears in the above-identified patent and that said Letters Patent is hereby corrected as shown below:

In Column 5, Line 4, delete "$2^{k-1}$" and insert -- $2^k-1$ --, therefor.

In Column 6, Line 57, delete "BMP," and insert -- $BMP_1$ --, therefor.

In Column 6, Line 62, delete "BMP3" and insert -- $BMP_3$ --, therefor.

In Column 6, Line 63, delete "BMP3" and insert -- $BMP_3$ --, therefor.

Signed and Sealed this

Thirtieth Day of September, 2008

JON W. DUDAS
*Director of the United States Patent and Trademark Office*